(12) United States Patent  
Jensen et al.

(10) Patent No.: US 11,781,673 B2  
(45) Date of Patent: Oct. 10, 2023

(54) WATER LEVEL CONTROL SYSTEM

(71) Applicant: KETO A.I., INC., Houston, TX (US)

(72) Inventors: Jeffrey S. Jensen, Houston, TX (US); Andrew D. Higgins, Houston, TX (US)

(73) Assignee: KETO A.I., INC., Houston, TX (US)

( * ) Notice: Subject to any disclaimer, the term of this patent is extended or adjusted under 35 U.S.C. 154(b) by 0 days.

(21) Appl. No.: 16/397,942

(22) Filed: Apr. 29, 2019

(65) Prior Publication Data

US 2019/0331252 A1   Oct. 31, 2019

Related U.S. Application Data

(60) Provisional application No. 62/795,459, filed on Jan. 22, 2019, provisional application No. 62/794,519, filed on Jan. 18, 2019, provisional application No. 62/664,791, filed on Apr. 30, 2018.

(51) Int. Cl.

| | |
|---|---|
| *E03C 1/232* | (2006.01) |
| *F16K 31/26* | (2006.01) |
| *E03C 1/242* | (2006.01) |

(52) U.S. Cl.  
CPC .............. *F16K 31/26* (2013.01); *E03C 1/232* (2013.01); *E03C 1/242* (2013.01)

(58) Field of Classification Search  
CPC ......... E03C 1/242; E04H 4/12; E04H 4/1245; E04H 4/1272; F16K 31/42–426; F16K 31/04–055; A61H 2033/0054  
See application file for complete search history.

(56) References Cited

U.S. PATENT DOCUMENTS

| | | | | |
|---|---|---|---|---|
| 3,848,627 A | * | 11/1974 | Page | G01F 23/241 137/392 |
| 4,380,091 A | * | 4/1983 | Lively | E04H 4/12 137/391 |
| 4,612,949 A | * | 9/1986 | Henson | G05D 9/12 137/2 |
| 4,630,634 A | | 12/1986 | Sasaki et al. | |
| 5,878,447 A | * | 3/1999 | Mogab | E04H 4/14 4/508 |
| 6,311,136 B1 | * | 10/2001 | Henry | G01F 1/8486 702/45 |

(Continued)

FOREIGN PATENT DOCUMENTS

| | | |
|---|---|---|
| KR | 10-2004-0024854 A | 3/2004 |
| WO | 2016176169 A1 | 11/2016 |

OTHER PUBLICATIONS

International Search Report and the Written Opinion of the International Searching Authority for PCT/US2020/014138 dated May 21, 2020, 12 pages.

(Continued)

*Primary Examiner* — David P Angwin  
*Assistant Examiner* — Nicholas A Ros  
(74) *Attorney, Agent, or Firm* — Patterson & Sheridan, LLP

(57) ABSTRACT

A method and apparatus for monitoring a water level in a basin are disclosed. An automatic refill system includes a level sensor coupled to a refill valve system. The refill valve system has a valve driven by an actuator. The actuator receives a signal from a controller in response to a measured water level. The refill valve system flows water into a basin from a water source until a desired level is reached.

17 Claims, 5 Drawing Sheets

(56) References Cited

U.S. PATENT DOCUMENTS

| | | | | |
|---|---|---|---|---|
| 6,910,498 B2* | 6/2005 | Cazden | ............... | E04H 4/12 |
| | | | | 137/386 |
| 7,174,912 B2* | 2/2007 | Lowe | ............... | E03C 1/052 |
| | | | | 137/434 |
| 7,619,181 B2* | 11/2009 | Authier | ............... | A61H 33/0095 |
| | | | | 126/210 |
| 7,931,447 B2* | 4/2011 | Levin | ............... | F04B 49/002 |
| | | | | 700/282 |
| 8,043,070 B2* | 10/2011 | Stiles, Jr. | ............... | F04B 49/20 |
| | | | | 417/326 |
| 8,459,100 B2 | 6/2013 | Biberger | | |
| 9,034,193 B2 | 5/2015 | Shalon | | |
| 9,410,336 B2* | 8/2016 | DeVerse | ............... | E04H 4/12 |
| 9,581,478 B1* | 2/2017 | Smith | ............... | G01F 1/666 |
| 9,761,990 B2* | 9/2017 | Koller | ............... | H01R 13/648 |
| 9,776,888 B1* | 10/2017 | Kurani | ............... | C02F 1/66 |
| 9,834,451 B2 | 12/2017 | Miller et al. | | |
| 10,150,680 B1 | 12/2018 | Kurani et al. | | |
| 10,219,975 B2* | 3/2019 | Potucek | ............... | G05D 7/0635 |
| 10,295,390 B2* | 5/2019 | Bian | ............... | G01F 23/266 |
| 2003/0034284 A1* | 2/2003 | Wolfe | ............... | A61H 33/6073 |
| | | | | 210/85 |
| 2003/0106582 A1 | 6/2003 | Jeong | | |
| 2008/0163416 A1 | 7/2008 | Go | | |
| 2010/0044601 A1 | 2/2010 | Weigen | | |
| 2012/0073040 A1* | 3/2012 | Cohen | ............... | E04H 4/12 |
| | | | | 4/504 |
| 2012/0187029 A1* | 7/2012 | Lauro | ............... | E04H 4/1272 |
| | | | | 210/85 |
| 2014/0259612 A1* | 9/2014 | Bauckman | ............... | H04Q 9/00 |
| | | | | 29/428 |
| 2014/0277777 A1* | 9/2014 | Potucek | ............... | E04H 4/148 |
| | | | | 700/282 |
| 2015/0152661 A1* | 6/2015 | Scullin | ............... | E04H 4/101 |
| | | | | 4/502 |
| 2016/0356026 A1* | 12/2016 | Engler | ............... | E03F 5/22 |
| 2017/0022728 A1* | 1/2017 | Simik | ............... | C02F 1/001 |
| 2017/0209338 A1* | 7/2017 | Potucek | ............... | B25J 9/1694 |
| 2018/0030636 A1 | 2/2018 | Park et al. | | |
| 2018/0148912 A1* | 5/2018 | Park | ............... | E03C 1/055 |
| 2018/0251993 A1* | 9/2018 | Irvine | ............... | B65G 65/005 |

OTHER PUBLICATIONS

Waterguru: How it Works, <https://waterguru.com/how-it-works.html>, retrieved Mar. 12, 2019.
Phin: Homepage, <https://www.phin.co/>, retrieved Mar. 12, 2019.

* cited by examiner

WATER LEVEL CONTROL SYSTEM

CROSS-REFERENCE TO RELATED APPLICATIONS

This application claims priority to U.S. Provisional Patent Applications Nos. 62/664,791, filed Apr. 30, 2018, 62/794,519, filed Jan. 18, 2019, and 62/795,459, filed Jan. 22, 2019, each of which is hereby incorporated by reference in their entirety.

BACKGROUND

Field

Embodiments of the present disclosure generally relate to water monitoring systems. More specifically, the disclosure relates to systems for maintaining water level in a basin.

Description of the Related Art

In pools and other containers of water, water levels are subject to change based on several factors such as evaporation, run-off, rain, and leaks. Improperly filled pools lead to flooding when water levels are too high or issues arise with circulation pumps, such as cavitation, or when water levels are too low, preventing recirculation to the pumps. Further, changes in water levels can have drastic effects on the concentration of chemicals used to control bacteria and algae growth therein.

Currently, the most common way to control pool water levels is through visually monitoring the water level and manually opening a valve to refill or remove water, if needed. This method requires a person to open a valve, wait for 1-2 hours while the pool fills or drains, and observe the water level to determine when the pool has reached the appropriate level. Some electrical monitoring systems have begun to appear on the market. However, such apparatuses are typically external mounts which connect to garden hoses and the like. These devices are cumbersome for an operator and typically have limited ranges of monitoring capabilities and inadequate flow control.

Thus, there is a need for improved water level control systems.

SUMMARY

In one embodiment, a refill valve system for maintaining water in a basin is provided, including a housing, a piping system including a valve, an outlet conduit fluidly coupled to the valve, and an inlet conduit fluidly coupled to the valve, and an actuated controller including an actuator coupled to the valve, a signal source, and a controller coupled to the signal source, wherein the controller receives a signal from the signal source to operate the actuator in response to a measured parameter of water within the basin, and wherein the actuator operates the valve such that a portion of water enters the basin through the outlet conduit.

In another embodiment, a water level system for maintaining a water level within a basin is provided, including a level sensor configured to be positioned within a skimmer, a control program coupled to the level sensor, and a refill valve system, including a housing, a piping system including a valve, an outlet conduit fluidly coupled to the valve, and an inlet conduit fluidly coupled to the valve, and an actuated controller including an actuator coupled to the valve, a signal source, and a controller coupled to the signal source, wherein the controller receives a signal from the signal source to operate the actuator in response to a measured parameter of water within the basin, and wherein the actuator operates the valve such that a portion of water enters the basin through the outlet conduit.

In another embodiment, a method of controlling a water level within a basin is provided, including providing a sensor within the basin containing water, taking a first measurement of the water level with the sensor, providing the first measurement to a control program, and providing a first signal to a valve in response to providing the first measurement.

The water filling systems and method disclosed herein at least partially automates the filling of water in a basin, e.g., a pool. Sensors present in the water contained in the basin allow for operation of a valve, which allows the flow of water into the basin and fills the basin to the desired level.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to water level monitoring systems. More specifically, the disclosure relates to systems for automatically maintaining a water level in a basin, such as a swimming pool. An automatic refill system includes a level sensor coupled to a refill valve system. The refill valve system has a valve driven by an actuator. The actuator receives a signal from a controller in response to a measured water level. The refill valve system flows water from a water source to refill the basin until a desired level is reached.

Figure 1:
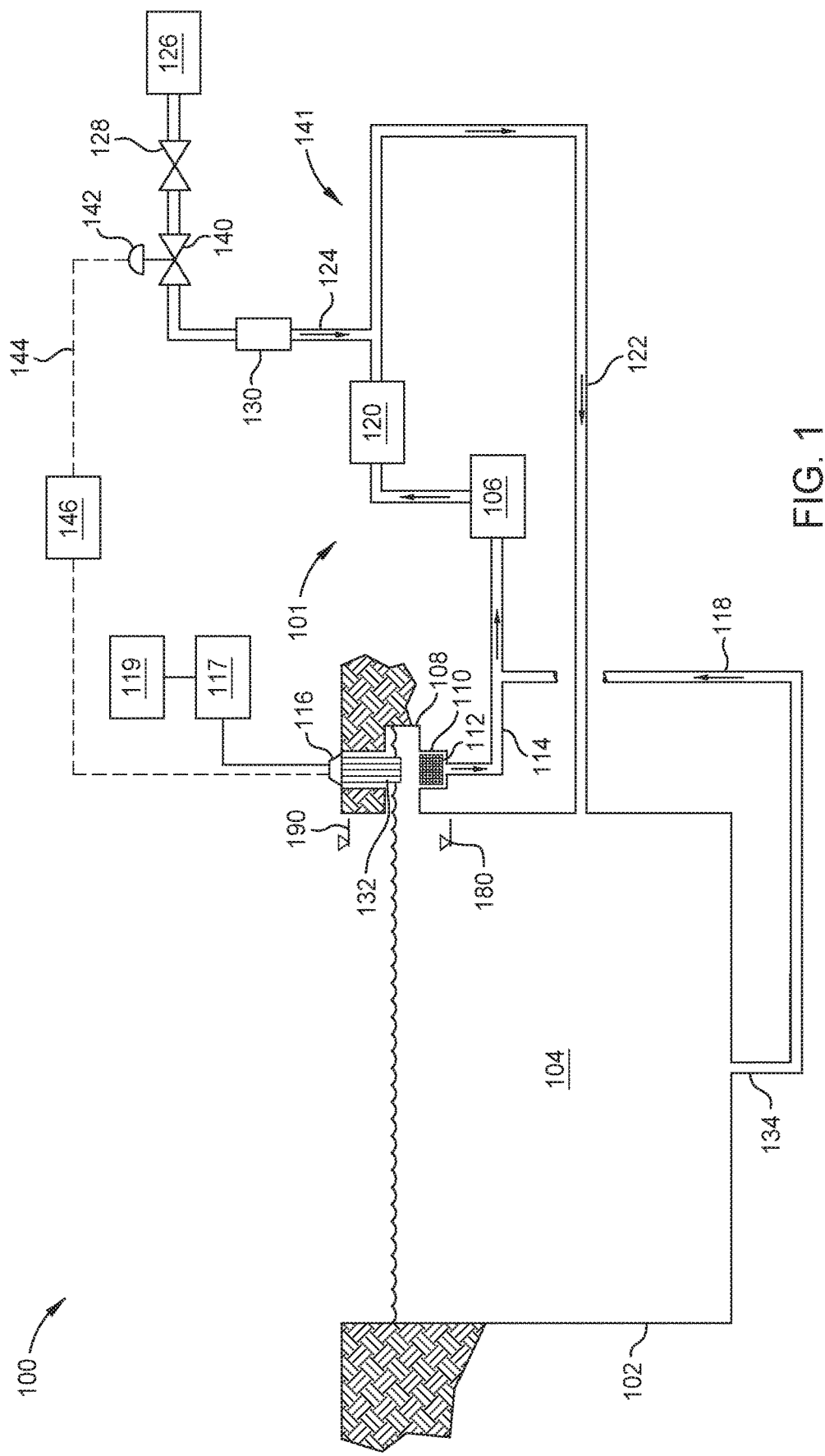
FIG. 1 illustrates a schematic arrangement of a pool system, according to one embodiment.

FIG. 1 illustrates a schematic arrangement of a pool system 100, according to one embodiment. The pool system 100 includes a basin 102 for containing water 104 therein, and a water level system 101. As shown, the water level system 101 includes one or more sensors 132, a control program 146, and a refill valve system 140. The basin 102 is fluidly coupled to a pump 106. At least one skimmer 108 is formed in a sidewall of the basin 102, the skimmer is disposed between the basin 102 and the pump 106, and the skimmer is fluidly coupled to the water 104 and the pump.

The skimmer 108 includes a sump 110 wherein a basket 112 is disposed. The basket 112 functions to catch debris, such as leaves, pollen, and the like, and prevent the debris from entering a pipe 114 which is fluidly coupled between the sump 110 and the pump 106.

A skimmer cover plate 116 is covers the skimmer 108. The skimmer 108 includes one or more sensors 132 positioned with the skimmer, and the one or more sensors measure parameters of water 104. The one or more sensors 132 are coupled to the skimmer cover plate 116, according to one embodiment. In one example, the sensors 132 measure water level, chemistry, and temperature of the water 104. The chemistry readings provided by the sensors 132 can include, but are not limited to, alkalinity, pH level, calcium hardness, concentration of dissolved solids, chemical concentration, oxidation reduction potential (ORP), and concentration of a sanitizer in the water 104. The chemistry readings provided by the sensors 132 include at least two of the preceding chemistry readings, according to one embodiment.

Temperature readings provided by the sensors 132 are used in concert with chemical readings from the sensors to provide accurate oxygen reduction potential (ORP) and pH readings of the water 104. For example, measured pH values of the water 104 will not be accurate unless the temperature of the water is taken into account. Temperature of the water 104 is also taken in account for capacitance adjustments of the sensor 132 for the water level. The temperature readings can also be used to calculate water comfort level for swimmers.

In another example, the sensors 132 include an acoustic sensor that measures raw acoustic data of the water 104, and this data can be used to calculate acoustic properties of the water 104, such as acoustic pressure, acoustic pressure fluctuations, sonar waveforms, and pulse waveforms. The raw acoustic data can be converted to the Fourier domain where the spectrum of the fluctuations, sounds, and/or waveforms can be analyzed and recognized for distinct waveform patterns, harmonics in the signal, and alternative types of acoustic footprints. Acoustic signaling from the skimmer cover plate 116 can be used to communicate with other acoustic devices (not shown) submerged in the water 104. Alternatively, received acoustic signals and waveforms can be interpreted as communication from other devices or be analyzed to detect splashes, submersions, or movements of distinct objects in the water 104.

In one embodiment, the sensor 132 includes an acoustic sensor, the acoustic sensor is strategically placed on the bottom or side of the basin 102, and the acoustic sensor transmits a signal to the skimmer 108 to indicate any acoustic changes in the pool or spa. Acoustic changes in the pool or spa can include people or objects entering or exiting the pool or spa. Different objects have distinct different sound patterns upon splashing or submerging into the water 104. Based on the proximity of an object entering the water 104 and the rate at which an object enters the water, distinct acoustic waveforms are analyzed, interpreted, and processed through advanced algorithms, such as with machine learning, to detect what type of object and where it fell into the water. One such method utilizes a discrete Fourier transform (DFT) and a convolutional neural network (CNN) to analyze different splash and submersion waveforms to detect the object and proximity to the skimmer 108.

The sensor 132 can also have the ability to detect water 104 interactions that reflect objects entering the water. This sensor 132, therefore, can have the capability to function as a pool alarm. Through the cloud-based software of a water 104 monitoring system, the skimmer 108 informs the system user of objects that have entered the water based on requirements or settings. The sensors 132 can be enclosed in one or more plastic tubes for protection from dirt and debris. The protective tube can be adequately vented to prevent air pockets or other scenarios which could negatively affect measurements. The protective tube is removable for the user or owner to clean the water level sensor 132. In one embodiment, during installation of the device, the protective cap of the pH/ORP/temperature sensor 132 must be removed The protective tube of the water level sensor 132 is designed to be removed as an interference fit and the sensor is bent to allow for easy removal of the protective cap of the pH/ORP/Temperature sensor. Both the pH/ORT/temperature sensor and the water level sensor are secured with thread forming screws with a watertight/weathertight seal. The sensors 132 can be replaced for refurbishment of the main device.

When the one or more sensors 132 includes a water level sensor, the water level sensor has a length of about 10 cm (4 inches) to about 23 cm (9 inches). A hardened plastic housing around the water level sensor 132 helps keep the sensor straight to minimize the amount of noise generated in the measurement. The water level sensor 132 is maintained in place with a custom made flange that helps to expose the air and temperature compensator at the top of the sensor that accounts for measurement adjustments based on environment conditions.

In addition, the water level sensor 132 is used to detect waves or movements in the water through the combination of software and unique circuitry. A common differential op-amp and microcontroller are configured to maintain the moving average value of the water level over a sampled period of time, denoted as the steady state "flat" average or water with no movement. This is also referred to as the reference voltage. The real time output of the water level is then measured at a higher sampling rate to determine rates of voltage change induced by a wave through the water. At certain wave heights, the water level sensor 132 triggers the circuit to an active state indicating the presence of movement in the water.

Furthermore, the water level sensor 132 includes noise dampening circuits, plastic reinforcement of the sensor, and proper internal calibration to detect water level changes as small as about 0.2 mm. This allows the sensor and microcontroller to specifically analyze gravitation leaks in the pool. Using a combination of moving average, zero detector, and derivative detection software filters, gravitation leaks in a pool can be detected in a 12 hour period with a high degree of accuracy. Due to the autonomous operation of the sensor, leak detection routines can be run every 24 hours at little power cost and provide beneficial analysis to identify costly pool leaks. The derivative detection software can be run on a microcontroller, such as an external computer, cloud computing system, or on the skimmer processor 117 as described below. The microcontroller actively establishes a normalized water level average over a period while using derivative edge detection algorithms to avoid sudden water level changes during this normalization process. It then uses the normalized water value to apply first order derivative and edge detection algorithms to determine sudden spikes of measured values on the water level sensor which constitute a "wave".

The skimmer cover plate 116 can be a smart cover plate, including a skimmer processor 117 and programmable software for analyzing the measurements provided by the sensors 132, and the cover plate can be further connected to the Internet or another manner of communication. The sensors 132 can also be disposed at different locations within the basin 102 other than the skimmer 108. In one embodiment, the bottom of the cover plate 116 is equipped with a micro or mini universal serial bus (microUSB or miniUSB) charging and communication port for connection to the communication unit. The function of this port is for initial setup, charging, troubleshooting and downloading of locally stored data. Another embodiment of this design includes a waterproof reset tactile switch, which allows the user to reset the device to factory settings. The tactical switch can include a force-sensitive resistor (FSR). The skimmer cover plate 116 includes a skimmer processor 117, the skimmer processor being wirelessly coupled to the controller 212, and the skimmer processor analyzes the measurement provided by the one or more sensors 132, according to one embodiment.

Any of the aforementioned or ensuing calculations, of any type, can be performed on the skimmer processor 117, an external computer, or a cloud computing system, and the skimmer processor 117 can be connected to the external computer or cloud computing system via a skimmer connection 119. The skimmer connection 119 can be a wired connection or a wireless connection, such as, but not limited to, Institute of Electrical and Electronics Engineers (IEEE) 802.11 (Wi-Fi), BLUETOOTH®, BLUETOOTH® Low Energy (BLE), global system for mobile communication (GSM), code division multiple access (CDMA), Enhanced Data Rate for GSM Evolution (EDGE), 3rd Generation (3G), Long Term Evolution (4G LTE), or 5th Generation (5G). The wireless connection 119 can include an antenna, and the antenna is configured for a WiFi, BLUETOOTH®, BLE, or cellular connection, or any combination of the above.

The skimmer cover plate 116 can include a series of indicator lights. The series of indicator lights can include a plurality of light-emitting diodes (LED) in the form of a light bar, a ring, a circle, or any other geometric shape. In one embodiment, the light bar, ring, or geometric shape is insert molded into the housing of the skimmer cover plate 116. The light bar is configured to change color depending on the data provided by the sensors 132, creating visual feedback of the water level, acoustic information and water chemistry. The light bar can be configured remotely, or altered manually through a resistive sensor. The visual indicator provides information about the current, past, and predicted water safety index for the water 104, according to one embodiment.

Depending on water chemistry, the LED light bar, ring or other geometric shape, can change color to convey the safety of the pool water. As an example, if the water was unsafe for swimming, the light illuminates with a first color, first example, red. If the water chemistry required correction, but was fit for use, the light illuminates with a second color, for example, orange. If the water is in good condition, a third color would illuminate, for example, green or blue. By activation of the force resistive sensor, an audio signal could also be triggered to activate an alarm or an audio message. In another embodiment of the design, an alternative button or switch is incorporated on the device in lieu of the force resistive sensor.

A drain 134 is formed in a bottom of the basin 102. The drain 134 is fluidly coupled to the pipe 114 and the pump 106 by a drain pipe 118. The drain 134 and the sump 110 deliver the water 104 contained within the basin 102 to the pump 106 for circulation through a filter 120. The filter 120 is, for example, a sand filter or membrane filter, which removes contaminates, such as solid debris and algae, from water 104. The filtered water exits the filter 120 and returns to the basin 102 through a return pipe 122. The filter 120 imposes a large pressure drop on the circulated water 104 due to the filter media (not shown) disposed therein. The pump 106 provides sufficient pressure to the water 104 in order to overcome the pressure drop of the filter 120 and circulate the water 104 contained within the basin 102.

A refill pipe 124 is fluidly coupled to the return pipe 122 downstream of the filter 120. The refill pipe 124 is in fluid communication with a water source 126, such as a spigot or a municipal water header, among other sources, which provides water to refill the basin 102. It is understood the refill pipe 124 can be fluidly coupled to the basin 102 at other locations. For example, the refill pipe 124 can be fluidly coupled to a sidewall of the basin 102 adjacent to the return pipe 122.

A backflow preventer 130 is fluidly coupled to the refill pipe 124, and the refill valve system 140 is located downstream from the backflow preventer and refill pipe, according to one embodiment. The backflow preventer 130 is, for example, a check valve, or the like, which prevents the water 104 circulated by the pump 106 through the filter 120 and the return pipe 122 from flowing therepast in the refill pipe 124. An isolation valve 128 is also fluidly coupled to the refill pipe 124. The isolation valve 128 is an on/off valve which functions to allow fluid communication between the basin 102 and the water source 126. For example, the isolation valve 128 can be opened in order to provide water to the basin 102 and can be closed in order to isolate the water source 126 therefrom. During operation of the equipment, the water source 126 is fluidly connected to the isolation valve 128, the isolation valve is fluidly coupled to the inlet conduit 202 of the refill valve system 140, the outlet conduit 204 of the refill valve system is fluidly coupled to the backflow preventer 130, the backflow preventer is fluidly coupled to the refill pipe 124, the refill pipe is fluidly coupled to the filter 120 and the return pipe 122, the return pipe 122 is fluidly cooled to the water 104 in the basin 102, the water is fluidly coupled to the pipe 114, the pipe is fluidly coupled to the pump 106, the pump 106 is fluidly coupled to the filter, the water is fluidly coupled to the drain 134, and the drain is fluidly coupled to drain pipe 118.

Figure 2:
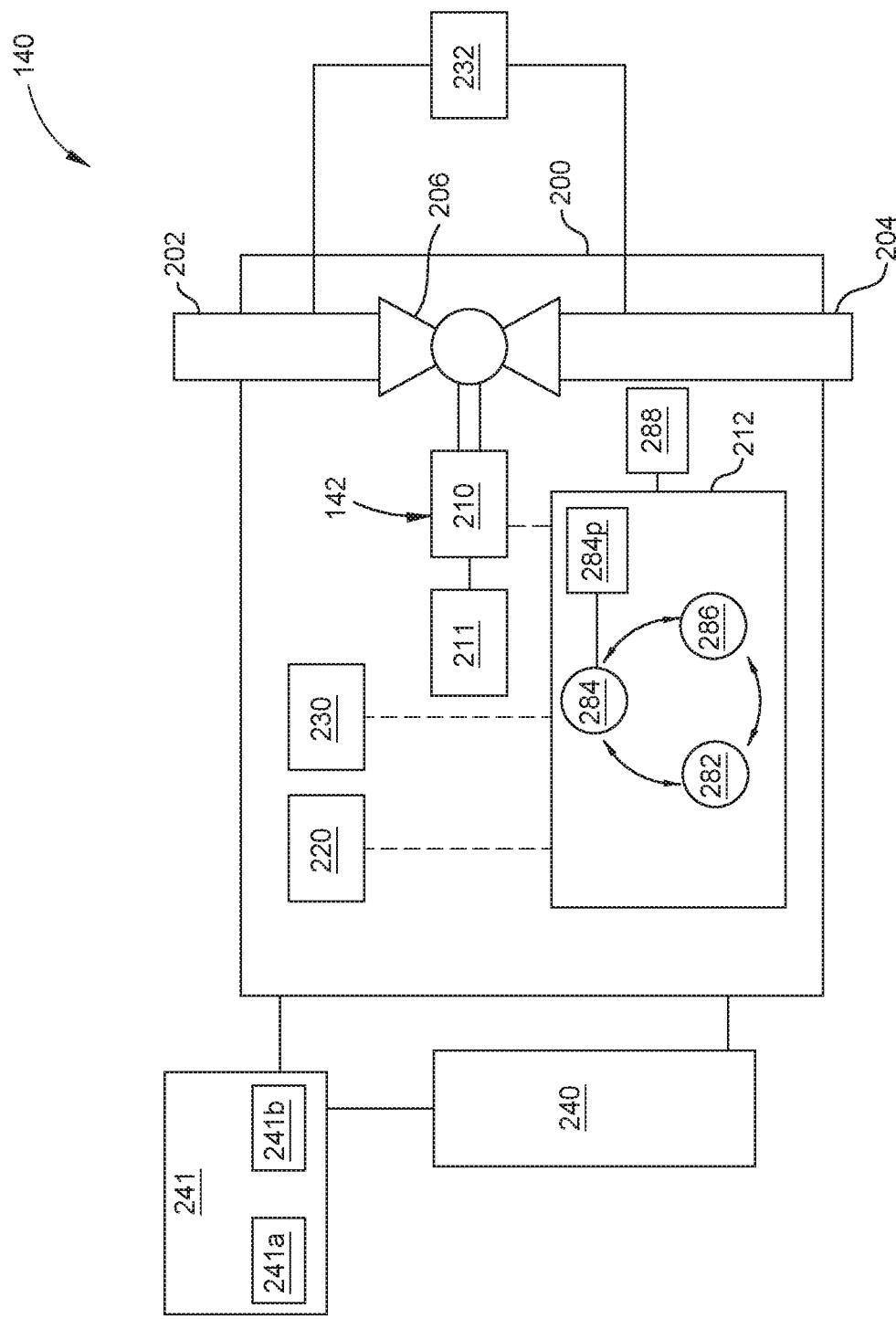
FIG. 2 illustrates a schematic arrangement of a refill valve system, according to one embodiment.

A refill valve system 140 is fluidly coupled with the refill pipe 124. As shown, the refill valve system 140 includes a housing 200 (FIG. 2), a piping system 141, and an actuated controller 142. As shown, the piping system 141 includes a valve 206, an inlet conduit 202, and an outlet conduit 204 (FIG. 2). The valve 206 is a ball valve, a butterfly valve, a solenoid valve, a globe valve, or the like, which is operable to control flow of water from the water source 126 to the basin 102. The refill valve system 140 is configured to provide on/off functionality as well as flow control (i.e., throttling) to control the flowrate of water from the water source 126 to the basin 102. In one example, the isolation valve 128 is removed and the refill valve system 140 functions to isolate the water source 126 from the basin 102.

As shown, the actuated controller 142 includes an actuator 210, a signal source 220, and a controller 212 (FIG. 2). The actuated controller 142 has a motor drive and control logic for operating the refill valve system 140. The actuated controller 142 is coupled to the sensors 132 by a connection 144. The connection 144 can be a wired connection or a wireless connection, such as, but not limited to, Institute of Electrical and Electronics Engineers (IEEE) 802.11 (Wi-Fi), BLUETOOTH®, BLUETOOTH® Low Energy (BLE), global system for mobile communication (GSM), code division multiple access (CDMA), Enhanced Data Rate for GSM Evolution (EDGE), 3rd Generation (3G), Long Term Evolution (4G LTE), or 5th Generation (5G). The wireless connection 144 can include an antenna, and the antenna is configured for a WiFi, BLUETOOTH®, BLE, or cellular connection, or any combination of the above.

In one example, a control program 146 is coupled to the sensors 132 and the actuated controller 142. The control program 146 is, for example, a hard coded program, a mobile application, a cloud-based machine learning program, or the like, which processes the signals from the sensors 132 and provides a signal to the actuated controller 142 to operate the refill valve system 140. In one embodiment, the cloud-based analytics server, using machine learning algorithms or other artificial intelligence routines, takes in current and historical sensor data to predict behavior of the pool chemistry, water level, and chemical reactions to alert users of the exemplary refill valve system 140 of upcoming events. The development of the machine learning algorithms is performed in the cloud using big data aggregation tools that train the models of the machine learning algorithms. The data gathered from the sensors of the refill valve system 140 can show patterns and trends because the data reflects biological cycles such as temperature rising and falling, sunlight for a predicted time of day, and evaporation constants that correlate with temperature.

Based on the data patterns and trends, highly accurate machine learning models are developed, and are sent to the user computing devices to run in an "offline" mode. The user computing devices can run machine learning algorithms using live data and can make predictions, even while offline. The refill valve system 140 uses predictions from the machine learning algorithms to be predictive with respect to when to fill the body of water 104, and how much flowrate to provide to fill the body of water to the desired fill level, instead of the refill valve system relying only on current measured data. System information gathered by the sensors 132 are analyzed locally on the device, and the information is transmitted to the cloud for storage, processing, and analysis using the aforementioned machine learning or other artificial intelligence algorithms.

Because water level, water temperature, and chemical characteristics can be gathered with a similar timestamp, machine learning methods, such as gradient boosting, can be used to determine and predict an appropriate amount of water to be added given evaporation constants and estimated chemical dilution given a certain amount of water added. The water level, water temperature, and chemical reading measurements are used as classifiers to the gradient boosting algorithm to predict the optimum amount of water to be administered during a given 48 hour window. According to some embodiments, the control program 146 compares data from the sensors 132 to calculate the water safety index. The water safety index can be provided by comparison with data from an appropriate water safety authority, for example, the Environmental Protection Agency (EPA). The data can be automatically downloaded from the appropriate safety agency's website via the connection 144, according to one embodiment. The data can be manually downloaded from the appropriate safety agency's website via the connection 144 by the user interfacing with the indicator 230, according to one embodiment. The water safety index can be predicted by the cloud-based analytics server, using past and current data obtained from the sensors 132.

In FIG. 1, the refill valve system 140 is located upstream of the backflow preventer 130. In this configuration, a vacuum breaker is optionally disposed downstream of the refill valve system 140. In an alternative example, the refill valve system 140 is located downstream of the backflow preventer 130. Such configurations allow for maintenance of the backflow preventer 130 without having to empty the basin 102 or shutdown the pump 106 and filter 120. More details of the refill valve system 140 and the actuated controller 142 are provided in reference to FIG. 2.

During operation, the sensors 132 monitor the level of the water 104 within the basin 102. The sensors 132 can monitor the level continuously or at a set frequency, such as at about 1 minute intervals. The sensors 132 take a measurement of the level of the water 104. The measurement is used by a program, such as the control program 146, to infer a level of the water 104 within the basin 102. The measured level is compared to a preset range of water levels which include an upper limit (i.e., a full condition, representative water level 190) and a lower limit (i.e., a low condition, representative water level 180). The program determines if the measured level is at an acceptable level within the preset range of water levels. If the program determines the measured water level is below a predetermined low level value, such as lower limit 180, the program provides a first signal to the actuated controller 142. The first signal is selected to be a signal to open the refill valve system 140 to flow water from the water source 126 to the basin 102. The sensors 132 continue to take measurements of the water level until the program determines the water level has returned to an acceptable level. At that point, the program selects and sends a second signal to the actuated controller 142 to close the refill valve system 140, thus stopping flow of the water from the water source 126 to the basin 102. The refill valve system 140 can also be configured to alert the user, instead of sending the second signal to the actuated controller 142.

In one example, the control program 146 includes a graduated scale of levels which are used to determine a necessary flowrate of the water from the water source 126. For example, if a very low water level is determined by the program, the refill valve system 140 can be opened 100% in order to provide the maximum flowrate of water to rapidly refill the basin 102. If the program determines a water level that is marginally outside of the acceptable range, the refill valve system 140 can only be opened slightly, such as less than about 50%, or less than about 20%, such as about 15%, to provide a low flowrate of water to the basin 102. The graduated control of flowrate of water to the basin 102 provides an adequate amount of water to the basin 102 without oversaturating or diluting the basin 102 with water, which can negatively influence the concertation of chemicals therein. Such chemicals, such as sanitizers, are used to prevent the growth of algae and bacteria in the basin 102.

In one exemplary embodiment, one of the sensors 132 of the skimmer 108 is a solid-state water level sensor. The solid-state water level sensor 132 determines the filter basket 112 condition in the skimmer 108, and can also determine pump 106 conditions. For example, as a skimmer basket 112 fills with debris, water flow is restricted and gradually increases the level of water in the skimmer 108. The water level sensor 132 can determine whether the basket 112 is clogged or free of debris. Similarly, the water level sensor 132 can detect whether the pump 106 is on or off. In one embodiment, the skimmer 108 uses machine learning in order to accurately and precisely determine pool conditions based on the history of data from the sensors of the skimmer 108. Based on the water level change in the skimmer 108, the pump 106 run times can be determined. This data can be post-processed to build a pump 106 "Circulation Profile". The information can be fed back to the user or owner via a web or mobile application providing recommendations on pump 106 efficiency, water quality, and energy usage.

In another example, the sensors 132 can also measure chemistry ratios, such as chlorine concentrations, within the water 104 of the basin 102. If a concentration of chlorine is too high and additional water is needed to dilute the concentration, a signal is sent from the program to the actuated controller 142 to open the refill valve system 140 in order to add an adequate amount of additional water to the basin 102. The program can determine an amount of water necessary to be flowed into the basin 102 through data gathered from the one or more sensors 132, such as water height, volume, temperature, and chemistry. In addition, the program can use other variables measured by the one or more sensors 132 to determine the amount of water necessary to be flowed into or removed from the basin 102. A solid-state sensor 132 with a resistive output can determine the water level from a stationary reference point, such as the bottom of the skimmer cover plate 116. The sensor 132 is configured, through voltage or resistive measurements, to provide a linear unit of measurement for water depth. The program uses equations and analysis of the data to determine the amount of water necessary to be flowed into the basin 102. In another embodiment, the water level can be measured by ultrasonic, laser, radar, magnetic or differential pressure level transmitters. In another embodiment, the water level can be measured with a float level transmitter.

FIG. 2 is a schematic arrangement of the refill valve system 140. The refill valve system 140 has a housing 200 which is a weatherproof body for containing components of the refill valve system 140 therein. The housing 200 is removable from the remainder of the components of the refill valve system 140. The housing 200 includes a piping system 141, wherein the piping system includes an inlet conduit 202, an outlet conduit 204, and a valve 206. At a first end, the inlet conduit 202 is disposed in the housing 200. The outlet conduit 204 is disposed in the housing 200 opposite to the inlet conduit 202. The inlet conduit 202 is in fluid communication with the outlet conduit 204 through the valve 206. The valve 206 selectively allows passage of a fluid from the inlet conduit 202 to the outlet conduit 204. The valve 206 is disposed in the housing 200, according to one embodiment. A vacuum breaker (not shown) is optionally coupled to the outlet conduit 204 within the housing 200. The housing 200 can also include a connection for water to the refill valve system 140, such as a Bibb hose connection, although other connections are contemplated.

The valve 206 is coupled to the actuated controller 142. An actuator 210 is coupled to the valve 206 in order to drive the valve 206 open and/or closed. The actuator 210 is, for example, an electric motor or motor actuator which is coupled to the stem (not shown) of the valve 206.

A power source 240 is coupled to the housing 200. In one example, the power source 240 is a hard wired connection that is in communication with a power network, such as a home electrical system. In another example, the power source 240 is a battery. The power source 240 can also include a power sourcing device 241 coupled to the housing 200, where the power sourcing device can include a photovoltaic solar cell 241a and/or a water turbine generator 241b, which is capable of providing an electrical charge to the battery, thus charging the battery, and providing a "green" power source for the refill valve system 140. The power source 240 provides electrical power to the refill valve system 140 to power the operations thereof, such as the actuator 210. The power source 240 can also include a wired connection coupled to a backup battery. The backup battery is configured to provide power to the refill valve system 140 in conditions when the wired connection is lost or fails to function. The refill valve system 140 can include a solar panel 211. Power is generated from water flow when the valve 206 is open. During periods of insufficient sunlight for solar power, the refill valve system can intermittently open the valve 206 and add small amounts of water to recharge the device on an as-needed basis.

The refill valve system 140 is equipped with a refill valve sensor 232 compatible with water, according to one embodiment. The refill valve sensor 232 measures pressure readings inside the piping system refill valve system 140. This data is analyzed to determine the flow rate of water entering the basin 102 and confirmation of valve 206 positioning and performance. Additionally, the refill valve sensor 232 can help determine leaks upstream or downstream of the refill valve system 140 and feed that information back to the owner or user. In one embodiment, the refill valve system sensor 232 is a water flow sensor flowmeter. The refill valve sensor 232 can be based on the Hall effect or other technique to determine fluid particle velocity for an overall calculation of water flow.

For example, the refill valve sensor 232 can include a pressure transducer which measures pressure upstream of downstream of the valve 206. When the valve 206 is open, a measured pressure drop is used to determine an approximate flow rate in the refill valve system 140, in combination with user-supplied inputs, such as diameter and material of various components of the refill valve system. With the pressure sensor, as other valves (i.e. sprinkler system) or faucets are opened in the user's home, and a pressure drop is measured in the refill valve system 140, alerts can be pushed to the home owner for flooding events or leaks. For example, if the pressure transducer measures a vacuum pressure, the valve 206 can close to prevent unwanted flow of water into the user's home, and thus the refill valve system 140 can act as a backflow preventer. The water pressure measurements can be continuously recorded, and the data aggregated in the cloud to determine water use of devices in the home.

A controller 212 is disposed in the housing 200 and is coupled to the actuator 210. The controller 212 provides signals to the actuator 210 to control the function of the valve 206. The controller 212 can include a printed circuit board (PCB), a central processing unit (CPU) 282, a memory 284, and a support circuit 286. The CPU 282 can be a processor that is suitable for processing of instructional programs. The memory 284 can be a random access memory, a read-only memory, a hard disk drive, a universal serial bus (USB) drive, or other forms of digital storage. The memory 284 can be removable and external from the controller 212, and the memory is interfaced to the controller through a memory port 284p. The memory 284 is a USB drive, and the memory port 284p is a USB port, according to one embodiment. The support circuit 286 is coupled to the CPU 282 and can include cache, clock circuits, input/output systems, power supplies, and the like.

The CPU 282 computes and transforms the data before transmitting the data to the cloud server by the connection 144, according to one embodiment. The controller 212 is configured to receive input from a signal source 220 coupled thereto. The signal source 220 can be a wired signal input or a wireless signal input, such as the connection 144 of FIG. 1. The signal source 220 provides an input, or a signal, to the controller 212 which is used to determine an operation of the valve 206. For example, the controller 212 can receive an input from the signal source 220 to open the valve 206 to allow passage of a fluid from the inlet conduit 202 to the outlet conduit 204. The signal source 220 can also provide an input to the controller 212 to close the valve 206. The controller 212 receives a signal from the signal source 220 to operate the actuator 210 in response to a measured parameter of water 104 within the basin 102, so that the actuator operates the valve 206 such that a portion of water enters the basin through the outlet conduit 204. The controller can also include a tactile switch 288, which can have a variety of functions, for example, manually refilling the basin 102, cancelling a fill of the basin, or a factory reset of the refill valve system 140. The tactile switch 288 also provides a method to actuate the valve 206 for pre-determined fill times. By pressing on the tactile switch 288, the switch can provide a means to activate the LED lights, which could for example, provide water fill level, audio feedback, water safety index or other parameters gathered or calculated by the sensors 132 as described above and below.

In another example, the signal source 220 is a BLUETOOTH® or BLE transmitter. The signal source 220 is wirelessly connected to an application that is, for example, operated by a user on a mobile device. The user can provide a signal to the controller 212 through the signal source 220 using the application to operate the valve 206, such as to open or close the valve. The user can also set a timer using the application to automatically open and/or close the valve 206 after a specified period. Thus, the refill valve system 140 can be remotely operated without the sensors 132 and connection 144 of FIG. 1. The refill valve system 140 can also include a manual override control, such as a valve wheel or the like. The manual override control allows the user to operate the valve 206 without using the actuated controller 142.

The power source 240 can be configured to provide a lower power mode when less power is required to run the refill valve system 140. The power source 240 enters the lower power mode automatically when less power is needed, such as when the controller 212 signals that the refill valve system 140 is not currently in use, according to one embodiment. The power source 240 enters the lower power mode when prompted by the user using the indicator 230, according to one embodiment.

The controller 212 is optionally coupled to a visual indicator 230. The visual indicator 230 is, for example, a series of indicator lights or a screen, which display the operational status of the refill valve system 140. In one example, the visual indicator 230 includes a first indicator light configured to indicate the operational status of the refill valve system 140, such as active (i.e., "on"). A second indicator light is configured to indicate a status of the power source 240, such as, in the case of a battery, to flash when the power source 240 has a low charge. In another example, the visual indicator 230 is a screen that indicates the operational status of the refill valve system 140 and the valve 206, such as, battery level, valve position, date, time, and the like.

The series of indicator 230 lights can include a plurality of light-emitting diodes (LED) in the form of a light bar, a ring, a circle, or any other geometric shape. In one embodiment, the light bar, ring, or geometric shape is insert molded into the housing 200. The light bar is configured to change color depending on the data provided by the sensors 132, creating visual feedback of the water level, acoustic information and water chemistry. The light bar can be configured remotely, or altered manually through a resistive sensor embedded in the solar panel 211. The visual indicator 230 provides information about the current, past, and predicted water safety index for the water 104, according to one embodiment. The visual indicator 230 can include a touch screen, wherein a user can manually operate the valve 206 through a touch command.

Depending on water chemistry, the LED light bar, ring or other geometric shape, can change color to convey the safety of the pool water. As an example, if the water was unsafe for swimming, the light illuminates with a first color, first example, red. If the water chemistry required correction, but was fit for use, the light illuminates with a second color, for example, orange. If the water is in good condition, a third color would illuminate, for example, green or blue. By activation of the force resistive sensor, an audio signal could also be triggered to activate an alarm or an audio message. In another embodiment of the design, an alternative button or switch is incorporated on the device (not shown) in lieu of the force resistive sensor. In another embodiment of the design, the LED light ring, bar, or other geometric shape is incorporated into the solar panel 211. This would allow for the solar panel 211 to increase in size, improving efficiency and power generation, in addition to a larger light bar, ring or other geometric shape.

Figure 3A:
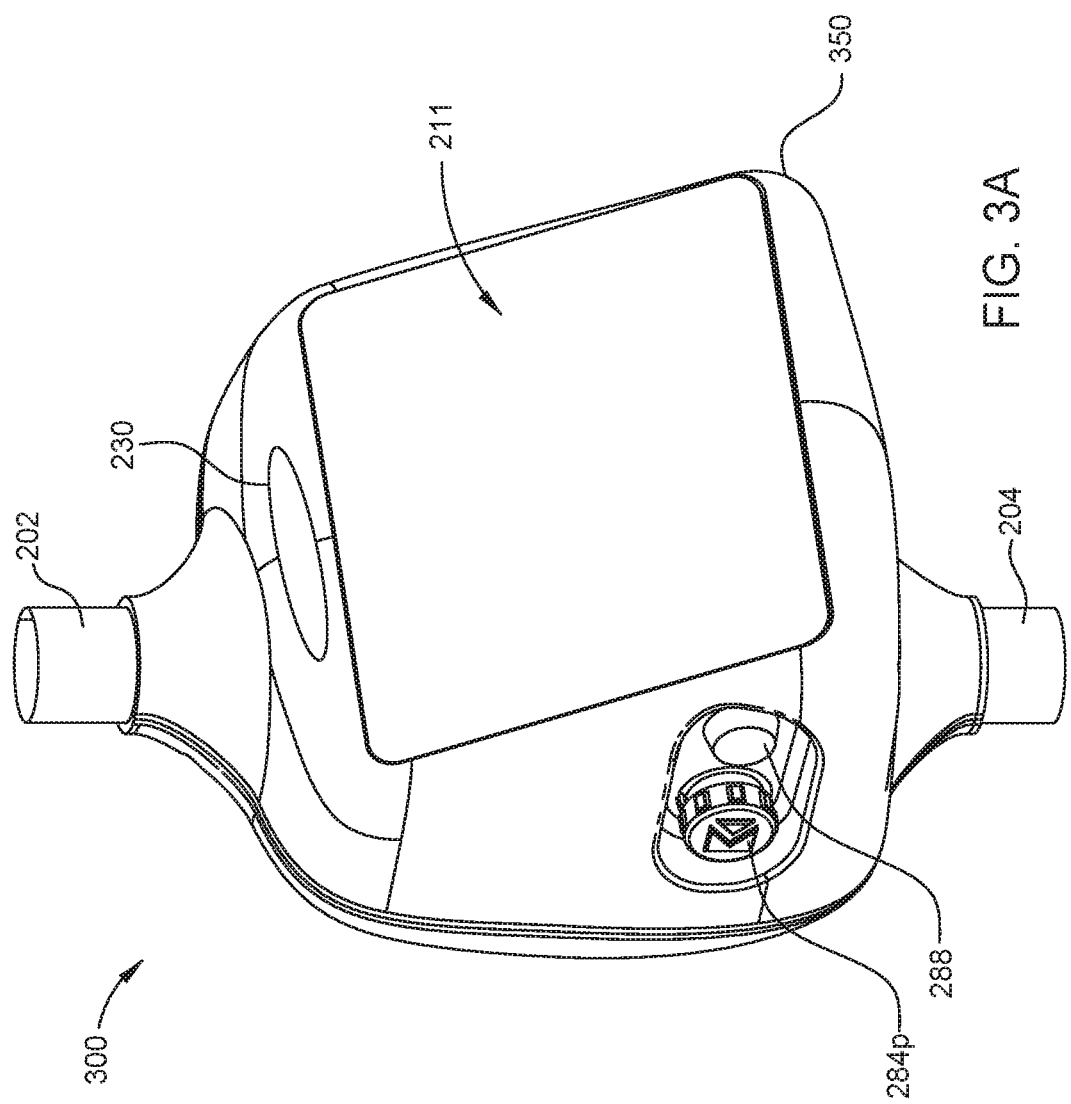
FIGS. 3A and 3B illustrate perspective views of a refill valve system, according to one embodiment.
Figure 3B:
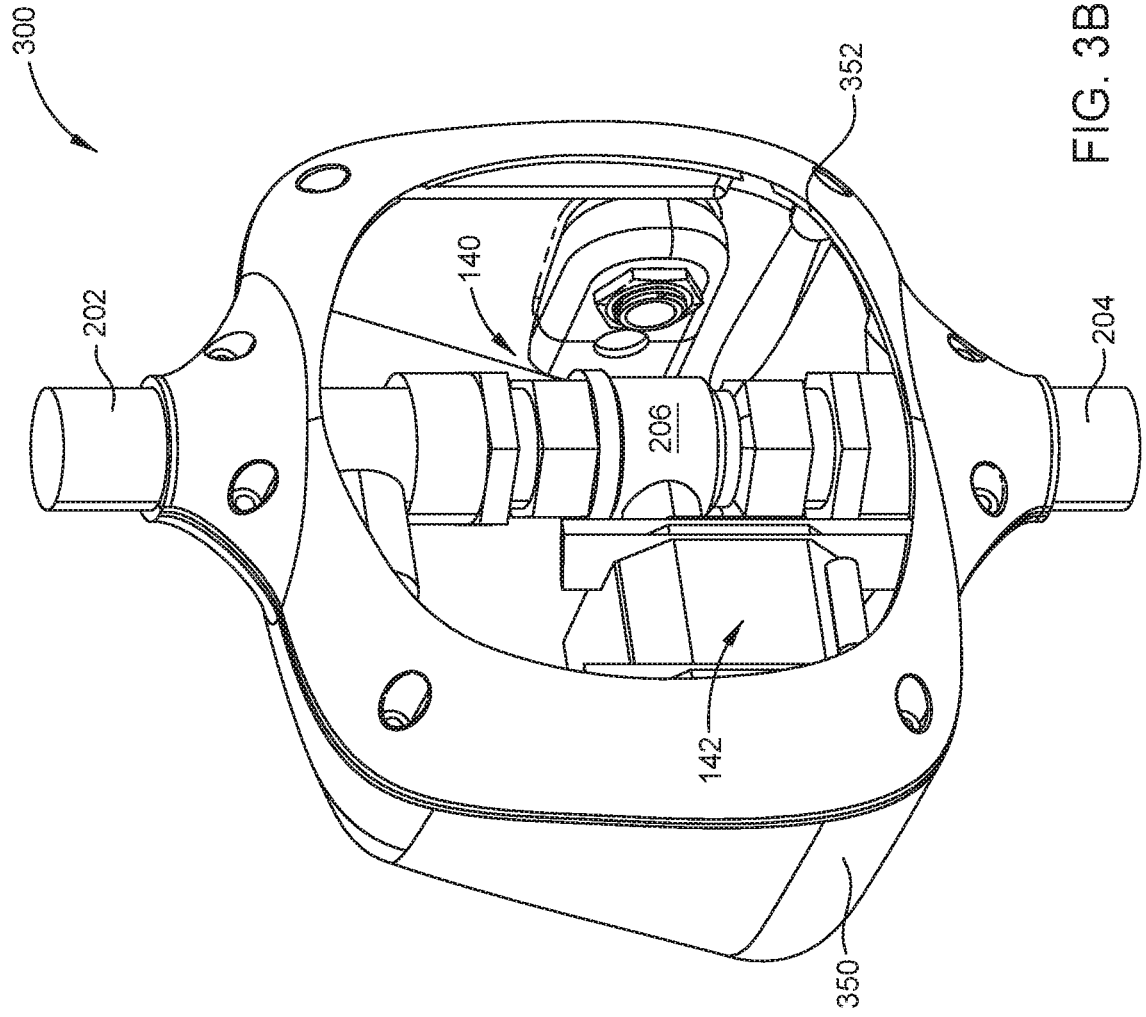

FIG. 3A is a front perspective view of refill valve system 300, according to one embodiment. FIG. 3B is a rear perspective view of the refill valve system 300 of FIG. 3A, according to one embodiment. In FIG. 3B, a rear door which seals a housing 350 at a seat 352 is removed so the internal cavity of the housing 350 is visible. The refill valve system 300 includes the housing 350, a piping system 141, and an actuated controller 142. The housing 350 encloses the valve 206 coupled to the actuated controller 142 therein. The housing 350 also encloses the inlet conduit 202 and an outlet conduit 204.

The housing 350 also includes a visual indicator 230. Here, the visual indicator 230 includes a light bar, as described above. The solar panel 211 is disposed on the housing 350 to charge the power source 240.

The tactical switch 288 can be located on the side of the housing 250, as shown in FIG. 3A. However, in other embodiments, the solar panel 211 for the housing 350 includes the tactile switch 288, embedded in the solar panel. In another embodiment, the tactile switch 288 is placed beneath the solar panel 211.

Figure 4:
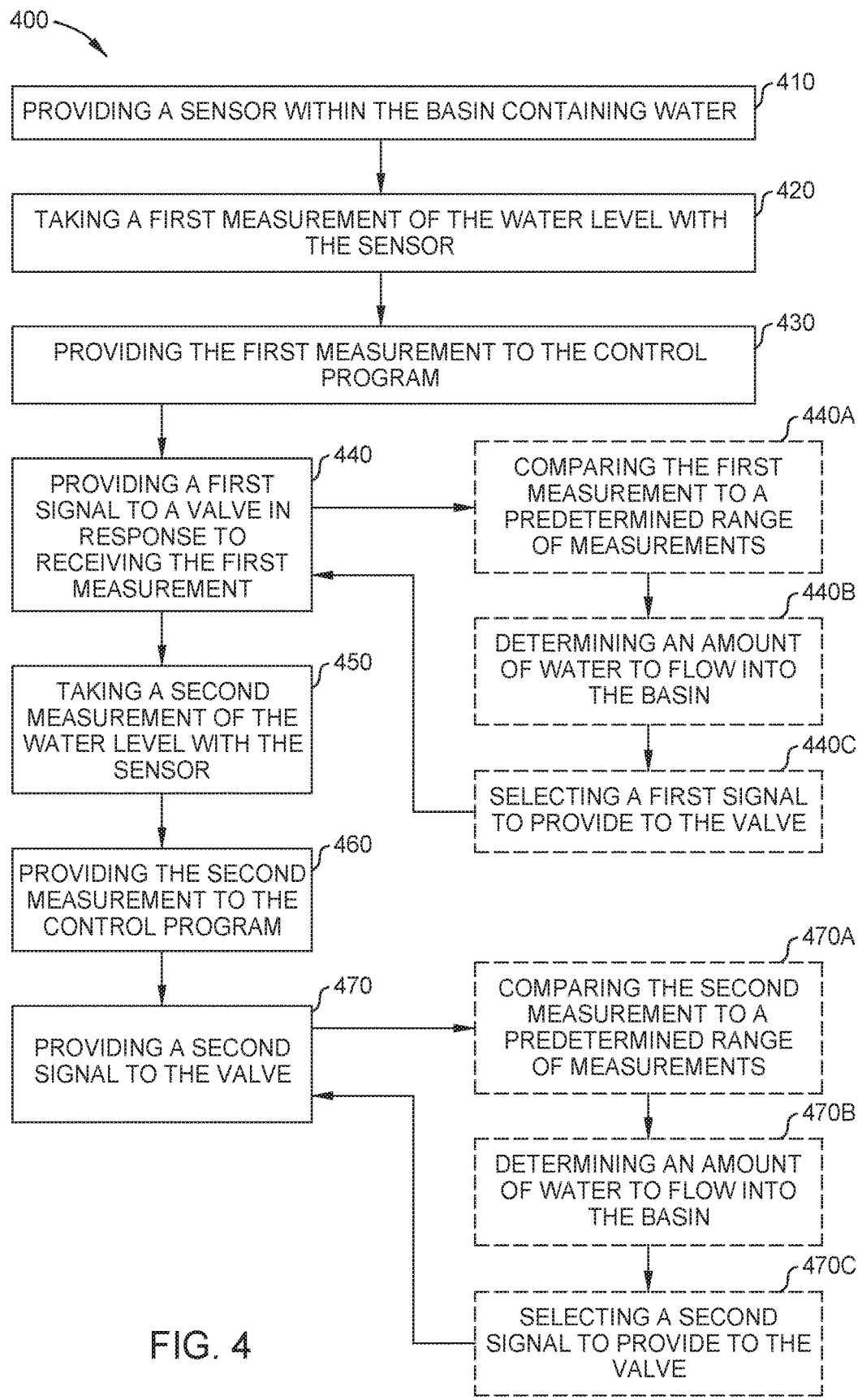
FIG. 4 is a flow diagram of method operations for controlling water level in a basin, according to one embodiment.

FIG. 4 is a flow diagram of method operations 400 for controlling water level in a basin, according to one embodiment. Although the method operations are described in conjunction with FIGS. 1-4, persons skilled in the art will understand that any system configured to perform the method operations, in any order, fails within the scope of the embodiments described herein. The method 400 begins at operation 410, where one or more sensors 132 are provided within the basin 102 containing water 104. The sensors can be included in a skimmer 108, as described above.

At operation 420, the one or more sensors 132 take a first water measurement of the water 104. The water measurement can be any of those described above, e.g., water level.

At operation 430, the first water measurement is provided to the control program 146 by the signal source 220. The control program 146 is, for example, a hard coded program, a mobile application, a cloud-based machine learning program, or the like, which processes the signals from the sensors 132. In one embodiment, the cloud-based analytics server, using machine learning algorithms or other artificial intelligence routines, takes in current and historical sensor data to predict behavior of the pool chemistry, water level, and chemical reactions to alert users of the exemplary refill valve system 140 of upcoming events. The development of the machine learning algorithms is performed in the cloud using big data aggregation tools that train the models of the machine learning algorithms. The data gathered from the sensors 132 of the refill valve system 140 can show patterns and trends because the data reflects biological cycles such as temperature rising and falling, sunlight for a predicted time of day, and evaporation constants that correlate with temperature. Based on the data patterns and trends, highly accurate machine learning models are developed, and are sent to the user computing devices to run in an "offline" mode. The user computing devices can run machine learning algorithms using live data and can make predictions, even while offline.

At operation 440, a first signal is provided to the valve 206 from the control program 146 in response to receiving the first measurement. If the program determines the measured water level is below a predetermined low level value, such as lower limit 180, the control program 146 provides the first signal to the actuated controller 142. The first signal is selected to be a signal to open the refill valve system 140 to flow water from the water source 126 to the basin 102. The sensors 132 continue to take measurements of the water level until the program determines the water level has returned to an acceptable level.

Operation 440 includes optional suboperations, according to some embodiments. At optional suboperation 440A, the first measurement is compared to a predetermined range of measurements, according to one embodiment. For example, a range of measurements could include a list of acceptable water levels for a given basin 102. In another example, the measurement could be compared to the lower limit 180 and upper limit 190.

At optional suboperation 440B, the control program 146 determines an amount of water to flow into the basin 102, according to one embodiment. The amount of water can be calculated from the size of the basin 102, and compared to the water level, in order to determine the volume of water to be added to the basin.

At optional suboperation 440C, the control program 146 selects the first signal to provide to the valve 206. The valve 206 can open fully or partially, depending on the desired flow rate and the desired water level in the basin 102. In one example, the control program 146 includes a graduated scale of levels which are used to determine a necessary flowrate of the water from the water source 126. For example, if a very low water level is determined by the program, the refill valve system 140 can be opened 100% in order to provide the maximum flowrate of water to rapidly refill the basin 102. If the program determines a water level that is marginally outside of the acceptable range, the refill valve system 140 can only be opened slightly, such as less than about 50%, or less than about 20%, such as about 15%, to provide a low flowrate of water to the basin 102. The flow can also be calculated as compared to the volume of the water needed, as provided in suboperation 440B.

At operation 450, the one or more sensors 132 take a second water measurement of the water 104, according to some embodiments. The water measurement can be any of those described above, e.g., water level.

At operation 460, the second water measurement is provided to the control program 146 by the signal source 220, according to some embodiments At operation 470, a second signal is provided to the valve 206 from the control program 146 in response to receiving the second measurement, according to some embodiments. At that point, the control program 146 selects and sends the second signal to the actuated controller 142 to close the refill valve system 140, thus stopping flow of the water from the water source 126 to the basin 102.

Operation 470 includes optional suboperations, according to some embodiments. At optional suboperation 470A, the second measurement is compared to a predetermined range of measurements, according to one embodiment. For example, a range of measurements could include a range of acceptable water levels for a given basin 102. In another example, the measurement could be compared to the lower limit 180 and upper limit 190.

At optional suboperation 470B, the control program 146 determines whether to stop the flow of water into the basin 102, because the water levels in the basin are at an acceptable level, according to one embodiment.

At optional suboperation 470C, the control program 146 selects the second signal to provide to the valve 206. The valve 206 can close fully or partially, depending on the desired flow rate and the desired water level in the basin 102. In one example, the control program 146 includes a graduated scale of levels which are used to determine a necessary flowrate of the water from the water source 126. For example, if the water level is in the acceptable range of water levels, the refill valve system 140 can be closed 100% in order to completely cut off the flowrate of water to the basin 102. If the control program 146 program determines a water level that is marginally outside of the acceptable range, the refill valve system 140 can be only opened slightly, such as less than about 50%, or less than about 20%, such as about 15%, to provide a low flowrate of water to the basin 102.

The method 400 can be repeated multiple times, until the desired water level in the basin 102 is reached, and the valve 206 is fully closed.

As described above, the refill valve system 140 can be installed on a newly constructed pool system 100 or retrofitted to an existing system. By utilizing the refill valve system 140 on the refill line as described above, the system for maintaining a pool level is automated, thus easing the maintenance requirements on an operator. Further, controlling the refill of a pool using a hard pipe connection reduces the number of components needed to install the system and provides a seamless connection for the user. The refill valve system 140 also reduces the footprint required for equipment thus increasing safety by eliminating tripping hazards and clutter around a pool.

The embodiments disclosed herein provide an automatic system for monitoring and maintaining a level within a basin, such as a swimming pool. The burden of maintenance on an operator or pool owner is greatly reduced by the automatic monitoring and refilling system disclosed. The control of the chemistry used within a pool basin can be increased thus improving maintenance and lowering costs of operation. The embodiments herein advantageously can be retrofitted to existing pool systems further reducing costs of the system. The use of programmable applications and machine learning further improves the operations of the system. Though the disclosure is described herein for use with a pool, other applications, such as fountains, tanks, or other water-containing basins where control of a water level is desired can also benefit from the disclosure.

While the foregoing is directed to embodiments of the present disclosure, other and further embodiments of the disclosure may be devised without departing from the basic scope thereof, and the scope thereof is determined by the claims that follow.

What is claimed is:

1. A refill valve system for maintaining water parameters and water levels in a basin, comprising:

a skimmer comprising one or more sensors, the one or more sensors configured to monitor at least a water chemistry or a water temperature and a water level;
a refill valve system comprising:
a housing;
a piping system, comprising:
a valve;
an outlet conduit fluidly coupled to the valve;
an inlet conduit fluidly coupled to the valve;
a refill valve sensor coupled to the outlet conduit and the inlet conduit, the refill valve sensor capable of determining leaks in the basin, leaks along the piping system, and determining water use;
a motor coupled to the valve; and
a controller assembly comprising:
a processor in communication with the motor, wherein the processor is configured to receive a signal and use a combination of moving average, zero detector, and derivative detection software filters to operate the motor in response to a measured parameter of water within the basin, wherein the motor is configured to operate the valve such that a portion of water enters the basin through the outlet conduit;
a program configured to control operation of the valve based upon analysis of the water chemistry of water within the basin, the water chemistry comprising one or more of:
an alkalinity;
a pH level;
a calcium hardness;
a concentration of dissolved solids;
a chemical concentration;
an oxidation reduction potential (ORP); and
a sanitizer concentration; and
a switch configured to override the processor when operated.

2. The refill valve system of claim 1, further comprising a visual indicator coupled to the controller assembly, the visual indicator configured to indicate an operational status of the valve.

3. The refill valve system of claim 1, further comprising a program configured to control operation of the valve based upon analysis of the measured parameter of water within the basin.

4. The refill valve system of claim 1, wherein the refill valve sensor is communicatively coupled to the valve, wherein the valve is configured to close when the refill valve sensor measures a vacuum pressure across the valve.

5. The refill valve system of claim 1, further comprising a visual indicator coupled to the housing, the visual indicator configured to create visual feedback of water level, acoustic information, water chemistry, or a combination thereof.

6. The refill valve system of claim 1, wherein the controller further comprises a memory port coupled to the controller, memory port comprising an interface point operable to receive removable memory.

7. The refill valve system of claim 1, further comprising a power source coupled to the housing.

8. The refill valve system of claim 7, further comprising at least one of a photovoltaic solar cell and a water turbine generator, both configured to provide an electrical charge to the power source, and both coupled to the housing.

9. A water level system for maintaining water parameters and a water level within a basin, the water level system comprising:
a skimmer comprising
one or more sensors disposed within the skimmer, the one or more sensors configured to measure at least a water chemistry or a water temperature and a water level
a first processor configured to communicate with a cloud-based control program,
the first processor coupled to the one or more sensors; and
a refill valve system coupled to the first processor, the refill valve system comprising:
a housing;
a visual indicator configured to indicate a water parameter status;
a piping system, comprising:
a valve;
an outlet conduit fluidly coupled to the valve;
an inlet conduit fluidly coupled to the valve;
a refill valve sensor coupled to the outlet conduit and the inlet conduit, the refill valve sensor communicatively coupled to the valve; and
a motor coupled to the valve;
a controller assembly comprising:
a second processor in communication with the motor, the second processor configured to receive a signal and use a combination of moving average, zero detector, and derivative detection software filters to operate the motor in response to a one or more parameters of the water and a measurement parameter of the refill valve sensor, the motor configured to operate the valve to control flowrate of water to the basin through the outlet conduit;
a program configured to control operation of the valve based upon analysis of the water chemistry of water within the basin, the water chemistry comprising one or more of:
an alkalinity;
a pH level;
a calcium hardness;
a concentration of dissolved solids;
a chemical concentration;
an oxidation reduction potential (ORP); and
a sanitizer concentration; and
a switch configured to override the second processor when operated.

10. The water level system of claim 9, further comprising a refill pipe and a backflow preventer, wherein the refill pipe is fluidly coupled to the backflow preventer, and the backflow preventer is fluidly coupled to the outlet conduit.

11. The water level system of claim 9, wherein the refill valve system further comprises a visual indicator coupled to the controller assembly, the visual indicator configured to indicate an operational status of the refill valve system.

12. The water level system of claim 9, wherein the refill valve system further comprises at least one of a photovoltaic solar cell and a water turbine generator, both configured to provide an electrical charge to a battery, the battery coupled to the motor and the second processor.

13. The water level system of claim 9, wherein the valve is a flow control valve.

14. The water level system of claim 9, wherein the one or more sensors are configured to measure each of a one or more parameters of the water, wherein the one or more parameters of the water comprise:
an alkalinity;
a pH level;
a calcium hardness;
a concentration of dissolved solids;

a chemical concentration;
an oxidation reduction potential (ORP); and
a sanitizer concentration.

15. The water level system of claim 9, wherein the one or more sensors comprise a level sensor coupled to a skimmer cover plate, the level sensor configured to use a laser to measure the water level.

16. The water level system of claim 15, wherein the skimmer cover plate comprises the first processor which is configured to analyze the measured parameter of water provided by the level sensor, the first processor wirelessly coupled to the controller assembly.

17. A water maintenance system for maintaining water chemistry and water level within a basin, the water maintenance system comprising:
   a skimmer comprising:
      one or more sensors configured to monitor one or more measured parameters of water within the basin, the measured parameters comprising a water level, a water temperature, and a water PH; and
      a first processor, the first processor coupled to the one or more sensors;
   a controllable refill valve system, the refill valve system comprising:
      a visual indicator configured to indicate a safety of a volume of water in a basin:
      a motor coupled to a valve and in communication with a controller;
      a refill valve sensor coupled to the valve and in communication with the controller;
   a program configured to control operation of the valve based upon analysis of the water chemistry of water within the basin, the water chemistry comprising one or more of:
      an alkalinity;
      a calcium hardness;
      a concentration of dissolved solids;
      a chemical concentration;
      an oxidation reduction potential (ORP); and
      a sanitizer concentration.
   a memory port coupled to the controller, memory port comprising an interface point operable to receive removable memory; and
   a second processor coupled to the controller and configured to;
      receive a signal,
      use a combination of moving average, zero detector, and derivative detection software filters to operate the motor in response to the measured parameters of water within the basin and a measurement parameter of the refill valve sensor, and
      operate the valve to control flowrate of water to the basin.

* * * * *